(12) United States Patent
Joosten et al.

(10) Patent No.: US 11,294,066 B2
(45) Date of Patent: Apr. 5, 2022

(54) METHOD FOR ESTIMATING A POSITION OF A MOBILE DEVICE USING GNSS SIGNALS

(71) Applicant: CycloMedia Technology B.V., Zaltbommel (NL)

(72) Inventors: Peter Joosten, Rotterdam (NL); Bart Johannes Beers, Rumpt (NL)

(73) Assignee: CycloMedia Technology B.V., Zaltbommel (NL)

( * ) Notice: Subject to any disclaimer, the term of this patent is extended or adjusted under 35 U.S.C. 154(b) by 237 days.

(21) Appl. No.: 16/615,266

(22) PCT Filed: May 22, 2018

(86) PCT No.: PCT/NL2018/050338
§ 371 (c)(1),
(2) Date: Nov. 20, 2019

(87) PCT Pub. No.: WO2018/217084
PCT Pub. Date: Nov. 29, 2018

(65) Prior Publication Data
US 2020/0158877 A1    May 21, 2020

(30) Foreign Application Priority Data
May 22, 2017   (NL) ..................... 2018961

(51) Int. Cl.
*G01S 19/20*  (2010.01)
*G01S 19/39*  (2010.01)
*G01S 19/47*  (2010.01)

(52) U.S. Cl.
CPC ............ *G01S 19/20* (2013.01); *G01S 19/393* (2019.08); *G01S 19/47* (2013.01)

(58) Field of Classification Search
CPC ......... G01S 19/20; G01S 19/393; G01S 19/47
(Continued)

(56) References Cited

U.S. PATENT DOCUMENTS 7,219,013 B1 *  5/2007  Young ................ G01C 21/165
                                                342/357.58
8,949,025 B2     2/2015  Garin
(Continued)

FOREIGN PATENT DOCUMENTS

WO      2008148794  A2    12/2008

OTHER PUBLICATIONS

Brown, "Receiver Autonomous Integrity Monitoring", Global Positioning System: Theory and Application, 1996, pp. 143-165, vol. 2.

*Primary Examiner* — Bo Fan
(74) *Attorney, Agent, or Firm* — The Webb Law Firm

(57) ABSTRACT

A method and system for estimating a position of a mobile device is disclosed. In particular, a method and system in which the position of a mobile device is determined using measurements of received Global Navigation Satellite System, GNSS, satellite signals is disclosed. The present invention therefore proposes to qualify a received satellite signal based on whether a signal propagation characteristic of this signal falls within an expected range of this characteristic. The expected range is determined using information about the satellite that sent the signal. The position of the mobile device is computed based on the validated satellite signals.

20 Claims, 5 Drawing Sheets

(58) Field of Classification Search
USPC .......................... 342/357.25, 357.3, 357.58
See application file for complete search history.

(56) References Cited

U.S. PATENT DOCUMENTS

2009/0058723 A1* 3/2009 Mao .................. G01S 19/47
342/357.3
2009/0254275 A1* 10/2009 Xie .................. G01C 21/26
701/469

* cited by examiner

METHOD FOR ESTIMATING A POSITION OF A MOBILE DEVICE USING GNSS SIGNALS

CROSS-REFERENCE TO RELATED APPLICATIONS

This application is the United States national phase of International Application No. PCT/NL2018/050338 filed May 22, 2018, and claims priority to Dutch Patent Application No. 2018961 filed May 22, 2017, the disclosures of which are hereby incorporated by reference in their entirety.

BACKGROUND OF THE INVENTION

Field of the Invention

The present invention relates to a mobile device and to a method for estimating a position of a mobile device. More in particular, the present invention relates to a method in which the position of a mobile device is determined using measurements derived from received Global Navigation Satellite System (GNSS) satellite signals.

Technical Considerations

GNSS receivers are well known in the art. These receivers allow the positioning of these receivers, or the devices in which they are incorporated, using signals from satellites that are orbiting the Earth. These receivers are often used in navigational systems. Hereinafter, the wording "position of the mobile device" and "position of the GNSS receiver" will be used interchangeably as in most cases there will be a fixed relationship between them. For example, the position of the mobile device may refer to the position of the center of gravity of the mobile device. This position can be found by first determining the position of the GNSS receiver that is part of the mobile device, and to then add the positional offset between the GNSS receiver and the center of gravity.

Known mobile devices can be equipped with a GNSS receiver, such as a GPS receiver, and one or more additional systems for estimating a position of the mobile device or aiding the estimation of the position of the mobile device. The information from both systems can be combined to provide a single estimation of the position of the mobile device.

An example of an additional system is an inertial measurement unit (IMU) that estimates a new position of the mobile device based on one or more previous positions and speeds, and an observed movement of the mobile device. Such IMU is incorporated in the mobile device and comprises accelerometers and gyroscopes.

It should be noted that the invention does not exclude other systems to provide an estimate of the new position of the mobile device, even if these systems are not incorporated in the mobile device. For example, if the mobile device follows a given trajectory that has been computed using a navigational system, positions that lie on this trajectory may be used to predict the position of the mobile device. Alternatively, the trajectory to be followed by the mobile device can be fixed, e.g. when the mobile device is incorporated in a train that moves along a given track.

The GNSS receiver typically receives a plurality of satellite signals from respective GNSS satellites that orbit the Earth. To accurately position the mobile device based on the satellite signals alone, a minimum number of signals from different satellites is required. For example, in GPS systems, the position of the mobile device/GNSS receiver can be computed using:

$$d_n = c(t_{t,n} - t_{r,n} + t_c) = \sqrt{(x_n-x)^2 + (y_n-y)^2 + (z_n-z)^2} \quad \text{Eq. 1}$$

where $d_n$ is the distance travelled by the satellite signal from GNSS satellite n to the GNSS receiver, c the effective speed of light, $t_{t,n}$ the time at which satellite n transmitted the signal referenced to the GNSS system time, $t_{r,n}$ the time at which the GNSS receiver received the signal from satellite n referenced to the GNSS receiver clock, and $t_c$ the time correction for the clock of the GNSS receiver relative to the GNSS system time. $x_n$, $y_n$ and $z_n$ refer to the location of satellite n at time $t_{t,n}$, x, y, z refer to the location of the GNSS receiver at $t_{r,n}$. To solve the above set of equations, more than three satellite signals are needed.

As stated above, it is known in the art to combine the various sources of information to estimate the position of the mobile device. For example, algorithms are known that combine GNSS signals and IMU signals to calculate the position of the mobile device. The following parameters are for example inputted to the algorithm to calculate the position of the mobile device at t=t1:

n GNSS signals from n satellites received at t=t1, with n being 0, 1, 2, 3 . . .

the previous position of the mobile device at t=t0, with t0<t1;

the angle of rotation relative to three different axes determined at t=t0; and the acceleration relative to the different axes determined at t=t1;

Based on the data above, the algorithm calculates the position at time-instant t=t1. The known algorithm employs weighing when combining the GNSS data and IMU data. For example, if satellite signals from a large number (>8) of satellites are received, a higher weighing factor is attributed to the satellite signals than in case wherein satellite signals from only a small number (<3) of satellites are received. Alternatively, the weighing can be implicit, i.e. each satellite signal is given an identical weight but the influence of the GNSS data outweighs the IMU data because of the fact that more satellite signals are available.

It is important to note that the existing algorithm and the existing systems are also capable of calculating a position accuracy measure e.g. expressed as a standard deviation or confidence region. The algorithm may process, in addition to the data above, an accuracy measure relating to the various parameters. The previous position x, y, z may for instance be associated with a position accuracy Dx, Dy, Dz. These accuracies may be different from each other and relate to the statistical probability of the true position of the mobile device being in a given interval. For example, it can be stated that the probability of the true position of the mobile device in the x direction being in the interval x−Dx:x+Dx corresponds to 95%, when Dx corresponds to two times the standard deviation and the distribution corresponds to a Gaussian distribution.

For the IMU data, several error sources can be identified which are often related to the mechanical structure or properties of the IMU unit. The effects of these errors are often well known.

The positioning based on satellite signals is also subject to inaccuracies and errors. These inaccuracies and errors are caused by inaccurate satellite positions, unknown satellite clock errors, unknown receiver clock errors, unknown ionospheric delays, unknown tropospheric delays, reflections ("multipath"), and other miscellaneous problems effecting the observations, such as electromagnetic interference. Most of these errors are varying slowly, and effects on the final calculation of the position after post processing are minimal due to proper modelling and using GNSS reference data using a variety of methods that are well known in the art. However, the local problems, such as multipath and EM interference, when present, do not vary slowly.

From the above, it can be concluded that various sources of data exist for calculating the position of the mobile device, e.g. GNSS systems and other systems. An important distinction between these systems is that the GNSS systems allow the determination of the position of the mobile device without having to rely on previously determined positions, provided that sufficient satellite signals are available. On the other hand, determining a position based on for example IMU data relies on a previous position and speed. Positions determined using GNSS signals are therefore less susceptible to the accumulation of errors.

As described above, the slow-varying errors in the GNSS signals can be estimated or predicted rather well, whereas the fast-varying errors cannot. Consequently, when using the algorithm described above, it is difficult to account for the fast-varying errors. In prior art approaches, these errors can therefore only be accounted for in hindsight. For example, when inspecting a series of determined positions, one or more positions may deviate from the trend visible in the series. These positions may have been inaccurately determined due to fast-varying errors in the GPS signal. When positioning is required in real-time, for instance as part of a navigational system, such approach is however not possible as the trend is not yet fully known.

It is therefore an object to improve the positioning of a mobile device, wherein the effects of fast-varying errors on the final calculated positions are mitigated or removed.

SUMMARY OF THE INVENTION

This object is achieved with the method for estimating a position of a mobile device as described herein. The mobile device is equipped with a GNSS receiver, such as a GPS receiver, that is time-synchronized with a GNSS system time. Here, time-synchronization implicates that the clock of the GNSS receiver has a fixed and known offset relative to the GNSS system time. This latter time is determined using atomic clocks, present in each satellite and synchronized via the ground segment of the constellation (such as GPS).

Time-synchronization between GNSS system time and the receiver clock can be obtained when the GNSS receiver substantially simultaneously receives a sufficient amount of GNSS satellite signals. For GPS signals a number of 4 different satellite signals would allow the earlier mentioned system of equations to be solved and $t_c$ to be found. Once time-synchronization is established, the synchronization is maintained during a considerable period as the drift of most GNSS receiver clocks is sufficiently small.

According to the invention, the method comprises the step of a) providing a measurement of one or more GNSS satellite signals from respective GNSS satellites that were received, at a first time-instant, by the GNSS receiver. As a next step b), a position and corresponding position accuracy measure of the mobile device are estimated for the first time-instant using: 1) obtained position and motion data for a second time-instant different from the first time-instant, 2) movement data concerning movement of the mobile device between the first and second time-instants and, optionally, 3) measurements of one or more of the received satellite signals which have not been determined to be invalid. The position is normally expressed in coordinates relative to a predefined origin. This coordinate system may correspond to the coordinate system used in the GNSS system, although the invention is not limited thereto. Moreover, the position accuracy measure may be different for the different coordinates.

According to the invention, the method comprises a step c) that comprises, for at least one of the received satellite signals, the steps of:

c1) determining a signal propagation characteristic pertaining to the at least one satellite signal using information contained in that satellite signal:

c2) determining an expected range for the signal propagation characteristic based on orbital behavior of the GNSS satellite that transmitted the at least one satellite signal and the estimated position and position accuracy measure; and c3) determining that the at least one satellite signal is a valid signal if the corresponding signal propagation characteristic falls in the determined expected range, and determining that the at least one satellite signal is an invalid signal if the corresponding signal propagation characteristic falls outside the determined expected range.

As a final step, the method according to the invention comprises a step d) of calculating the position, and preferably the position accuracy measure, of the mobile device at the first time-instant using the valid satellite signal(s). The present invention therefore proposes to only use those satellite signals which have been determined to be valid signals. However, this last step does not exclude that other, preferably non-satellite, sources of information are also used for calculating the position of the mobile device, such as IMU data.

The present invention proposes to qualify a received satellite signal based on whether a signal propagation characteristic of this signal falls within an expected range of this characteristic. The expected range is determined using information about the satellite that sent the signal. For example, the range can be determined using the known orbital trajectory of the satellite.

According to the invention it is possible to distinguish between valid and invalid satellite signals. These latter signals are likely to correspond to the earlier mentioned fast-varying errors and would considerably increase the position accuracy measure. Not taking these signals into account will therefore considerably increase the accuracy of the system. Hence, according to the invention, the estimated position of the mobile device will be closer to the actual, but unknown, true position of the mobile device.

As an example, the signal propagation characteristic pertaining to the at least one satellite signal may comprise a distance travelled by the respective satellite signal. Here, it is noted that the distance travelled by the respective satellite signal can be considered equivalent to the time required by the satellite signal to cover this distance.

Further to the above, the at least one satellite signal may comprise information concerning the time-instant at which that signal was sent. In addition, step c1) may comprise extracting a sent time-instant, at which the at least one satellite signal was sent, from the at least one satellite signal. For example, the satellite signal may comprise digital data comprises a representation of the sent time-instant.

Step c1) may further comprise determining a receive time-instant, at which the at least one satellite signal was received by the GNSS receiver, and determining the distance travelled based on the sent and receive time-instants. For this latter calculation, the center term in Eq. 1 can be used. Here, it is noted that, due to the time-synchronization, the offset $t_c$ is known and/or can be computed. The time-instant at which the satellite signal was received, as determined by the GNSS receiver clock, can therefore be correlated to the time-instant at which the satellite signal was sent, as determined by the atomic clock of the GNSS satellite.

To determine the expected range for the signal propagation characteristic, step c2) may comprise iteratively determining a position at which a GNSS satellite would have been if this satellite had sent a satellite signal from that position that would have been received by the mobile device at the estimated position and at the first time-instant, and determining the expected range for the signal propagation characteristic based on the iteratively determined position and the estimated position accuracy measure. For example, a distance can be guessed between a) the satellite at the time it sent a hypothetical satellite signal and b) the mobile device positioned at the estimated position and which received the hypothetical satellite signal. Dividing this distance by the effective speed of light results in a guess for the time required by the hypothetical satellite signal to travel from the satellite to the mobile device. Subtracting this time from the time at which the hypothetical satellite signal is received allows the time at which the satellite sent the hypothetical satellite signal to be computed. In turn, this time can be used in combination with orbital data of the satellite to compute the position of the satellite at the time of sending the hypothetical satellite signal. Using this computed position, a distance between the satellite and mobile receiver can be calculated. This latter distance can be compared to the initial guess. If this difference is within a given threshold, the initial guess of the distance and/or the calculated distance can be assumed to be correct. This same approach can be used to determine how the position range translates into a range for the distance between satellite and mobile device. This example related to determining a range for the distance between satellite and mobile device. Similarly, a range could be constructed for the time required by the satellite signal to travel between the satellite and the mobile device.

One or more of the received satellite signals may comprise ephemeris data that allows the positions of the one or more GNSS satellites to be computed as a function of time. Hence, the mobile device may receive data for computing the orbital positions of the satellites as a function of time using information received from these satellites themselves. In an embodiment, a single satellite signal may comprise sufficient data for the mobile device to compute the positions of all satellites in the corresponding GNSS system. The invention does not exclude other means of providing the ephemeris data. Such data may be provided from an external source and/or may be provided in a post-processing approach.

The method according to the invention allows the qualification of satellite signals into valid and invalid signals. This qualification is used to calculate the position of the mobile device at the first time-instant. For example, the method may comprise, as a step c4), if it is determined in step c3) that the at least one satellite signal is valid whereas this signal was not used for estimating the position in step b), returning to step b) at least once to estimate the position and corresponding position accuracy measure taking into account the validated at least one satellite signal. Alternatively, the method may comprise, as a step c4), if it is determined in step c3) that the at least one satellite signal is invalid whereas this signal was used for estimating the position in step b), returning to step b) at least once to estimate the position and corresponding position accuracy measure no longer taking into account the invalidated at least one satellite signal.

Furthermore, said returning to step b) may be performed until each received satellite signal has been determined either valid or invalid and if no changes in this determination have occurred in the latest iteration of step c3). The method may therefore repeat itself to allow each satellite signal to be qualified. This qualification may change in time. For example, in a situation wherein a first satellite signal was initially considered invalid as the determined distance did not fell into the expected range, this same signal may be re-determined as being valid due to the fact that the estimated position and corresponding range changed due to the determination that other satellite signals were either invalid or valid. For that reason, it may be advantageous to repeat the steps above until each satellite signal has been qualified and until the qualification no longer changes.

In step b), none of the received satellite signals may be used to provide a first estimation of the position and corresponding position accuracy measure. In this case, the first estimation is solely based on information from other sources, such as IMU data. Steps c1)-c4) may then be consecutively performed, each time for a different subset of the received satellite signals, the subset preferably comprising a single satellite signal. This allows each satellite signal to be individually qualified. Once a signal is qualified as being valid, the estimated position is preferably re-calculated.

In another exemplary method according to the invention, each of the received satellite signals is used in step b) to provide a first estimation of the position and corresponding position accuracy measure. Then, steps c1)-c4) may be consecutively performed, each time for each of the received satellite signals. Alternatively, steps c1)-c4) may be consecutively performed, each time for one or more satellite signals.

In another exemplary method according to the invention, all but one or more of the received satellite signals is used in step b) to provide a first estimation of the position and corresponding position accuracy measure. Then, steps c1)-c4) may be consecutively performed, each time for said all but one or more of the received satellite signals.

A position and corresponding position accuracy measure may be determined for a plurality of time-instants, this plurality of time-instants comprising the first time-instant and the second time-instant. The first time-instant and the second time-instant may be temporally adjacent time-instants.

The method may further comprise determining a movement of the mobile device between the second time-instant and the first time-instant, and determining the movement data from the determined movement. This movement data may be determined using an inertial measurement unit. This movement data may for instance comprise a determined rotation and acceleration relative to three different axes, and a respective error for these rotations and accelerations.

The present invention is not limited to inertial measurement units for providing movement data. For example, the movement of the mobile device can be restricted by one or more restrictions and/or the movement of the mobile device can be predefined to a particular trajectory and/or speed. In these cases, the movement data can be derived from at least one of the one or more restrictions and said particular trajectory and/or speed. For example, the mobile device can be incorporated in a train that moves along a given trajectory. Additionally or alternatively, a distance measurement unit may be used to measure a distance travelled between the time instants. If the mobile device is carried by a pedestrian, restrictions can be imposed on the possible movement of the mobile device between time instants given the fact that the pedestrian was running or walking.

The method of the invention can be performed real-time, wherein a current position of the mobile device needs to be determined. Alternatively, the method can be employed offline. For example, step a) may comprise receiving and measuring one or more GNSS satellite signals from respective satellites that were received at a plurality of different time-instants, and selecting a pair of preferably temporally adjacent time-instants and performing the method described above using the selected pair of time-instants. When dealing with a large quantity of time-instants, it may be sufficient to establish time-synchronization at one or a few of these time-instants. Furthermore, when the actual processing of the various measurements is performed at a later stage, a time-synchronization that is established for a time-instant t3 may be used when determining the position of the mobile device at t=t2, with t2<t3.

When having performed a large quantity of measurements corresponding to a large amount of time-instants prior to applying the method described above to determine the position of the mobile device at these time-instants, it becomes possible to determine a position of the mobile device at a given time-instant using measurements and other data corresponding to time-instants that correspond to the future relative to said given time-instant. This approach can be referred to as a backward determination of the positions, whereas the forward determination corresponds to the determination of positions at time-instants using data that corresponded to previous time-instants.

The abovementioned backward and forward determination may be combined. For example step a) may comprise a) receiving and measuring one or more GNSS satellite signals from respective satellites that were received at a plurality of different time-instants, and b) selecting at least two temporally adjacent time-instants among said plurality of time-instants as the first and second time-instants and performing the method according to any of the previous claims to determine the position of the mobile device at the first time-instant. The first time-instant may be earlier than the second time-instant or vice versa.

The selecting of at least two temporally adjacent time-instants may comprise selecting the first time-instant, the second time-instant, and a third time-instant, wherein the first time-instant is temporally arranged in between the second and third time-instant. Furthermore, step b) may comprise estimating a first position and first corresponding position accuracy measure of the mobile device for the first time-instant using: 1) obtained position and motion data for the second time-instant, 2) movement data concerning movement of the mobile device between the first and second time-instants, and optionally, 3) measurements of one or more of the received satellite signals which have not been determined to be invalid. Step b) may further comprise estimating a second position and second corresponding position accuracy measure of the mobile device for the first time-instant using: 1) obtained position and motion data for the third time-instant, 2) movement data concerning movement of the mobile device between the first and third time-instants, and optionally, 3) measurements of one or more of the received satellite signals which have not been determined to be invalid. In addition, step c2) may comprise determining a first expected range for said signal propagation characteristic based on orbital behavior of the GNSS satellite that transmitted said at least one satellite signal and the first estimated position and corresponding first position accuracy measure, and determining a second expected range for said signal propagation characteristic based on orbital behavior of the GNSS satellite that transmitted said at least one satellite signal and the second estimated position and corresponding second position accuracy measure.

Hence, it is possible to determine a respective estimated position and corresponding position accuracy measure depending on whether the third or second time-instant is used as a starting point. These positions and errors result in a different expected range, depending on whether the determination is performed backwards or forwards.

It may be possible to combine the various determined positions and ranges. For example, step c3) may comprise determining that said at least one satellite signal is a valid signal if the corresponding signal propagation characteristic falls in the determined first expected range and second expected range, and determining that said at least one satellite signal is an invalid signal if the corresponding signal propagation characteristic falls outside the determined first expected range and/or second expected range.

The method may comprise receiving, at a given time-instant among said plurality of different time-instants, satellite signals from at least four different satellites and calculating a time-offset between the GNSS system time and a clock of the GNSS receiver using the received at least four different satellites. Once sufficient satellite signals have been received, time synchronization can be established. This particularly holds for offline determination wherein the various measurements of the satellite signals are first stored and processed at a later stage. In this manner, time synchronization that is established relatively late during the data gathering can be used to compute positions that correspond to the early stages of the data gathering.

According to a second aspect, the invention relates to a mobile device that comprises a GNSS receiver, a memory for holding one or more measurements of satellite signals that have been received using the GNSS receiver and for holding one or more measurements of the inertial measurement unit, and a processing unit, coupled to the memory, and configured to implement the method as defined above for determining a position of the mobile device.

The mobile device may comprise movement data generating means for providing movement data concerning movement of the mobile device. The movement data generating means may comprise an inertial measurement unit.

According to a third aspect, the invention relates to a data carrier comprising instructions, which, when executed by a processing unit, cause the implementation of the method as defined above.

BRIEF DESCRIPTION OF THE DRAWINGS

Next, the invention will be described in more detail referring to the appended figures, wherein.

DESCRIPTION OF THE INVENTION

Figure 1:
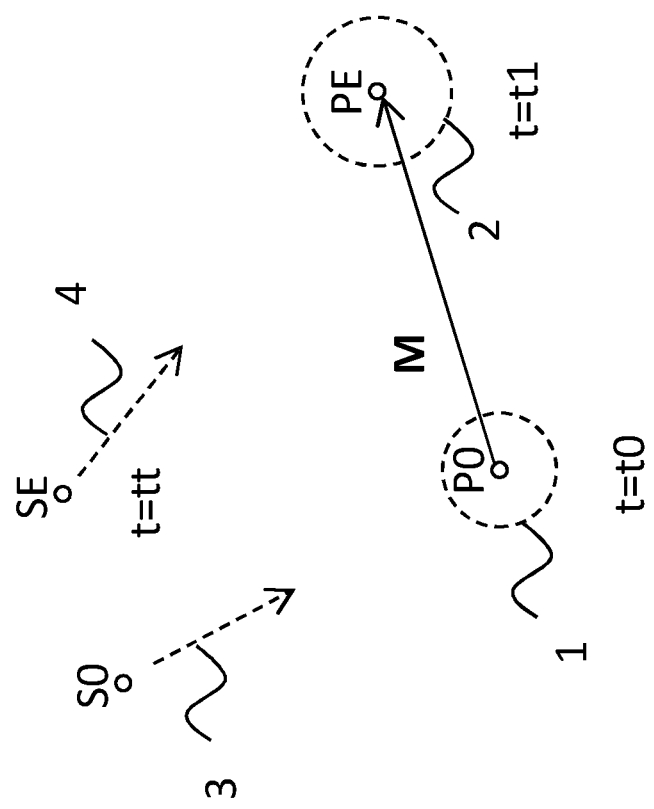
FIG. 1 illustrates the general concept of determining the position of a mobile device in accordance with the present invention.

FIG. 1 illustrates the general concept of determining the position of a mobile device in accordance with the invention. Here, a moving GNSS receiver has a determined position at t=t0 equal to P0. The error in this position is indicated by circle 1. The receiver is moving and its movement is described by a vector M. At t=t0, the receiver has received a signal 3 from a GNSS satellite that, at the time of sending this signal, was positioned at S0.

Next, the position of the GNSS receiver must be determined at t=t1. To this end, the validity of a satellite signal received at t=t1 should be examined. This validation requires that a position and corresponding position accuracy measure of the GNSS receiver at t=t1 is first estimated. The position estimation is denoted by PE, whereas the position accuracy measure is indicated by circle 2.

Different scenarios for estimating the position and the associated position accuracy measure exist. For now, it is assumed that the position and position accuracy measure of the mobile device at PE are solely based on data that was available at t=t0. As an example, this data comprises only IMU data, e.g. position P0, movement vector M, and a measure of the movement between P0 and PE as determined by the IMU unit.

Figure 2:
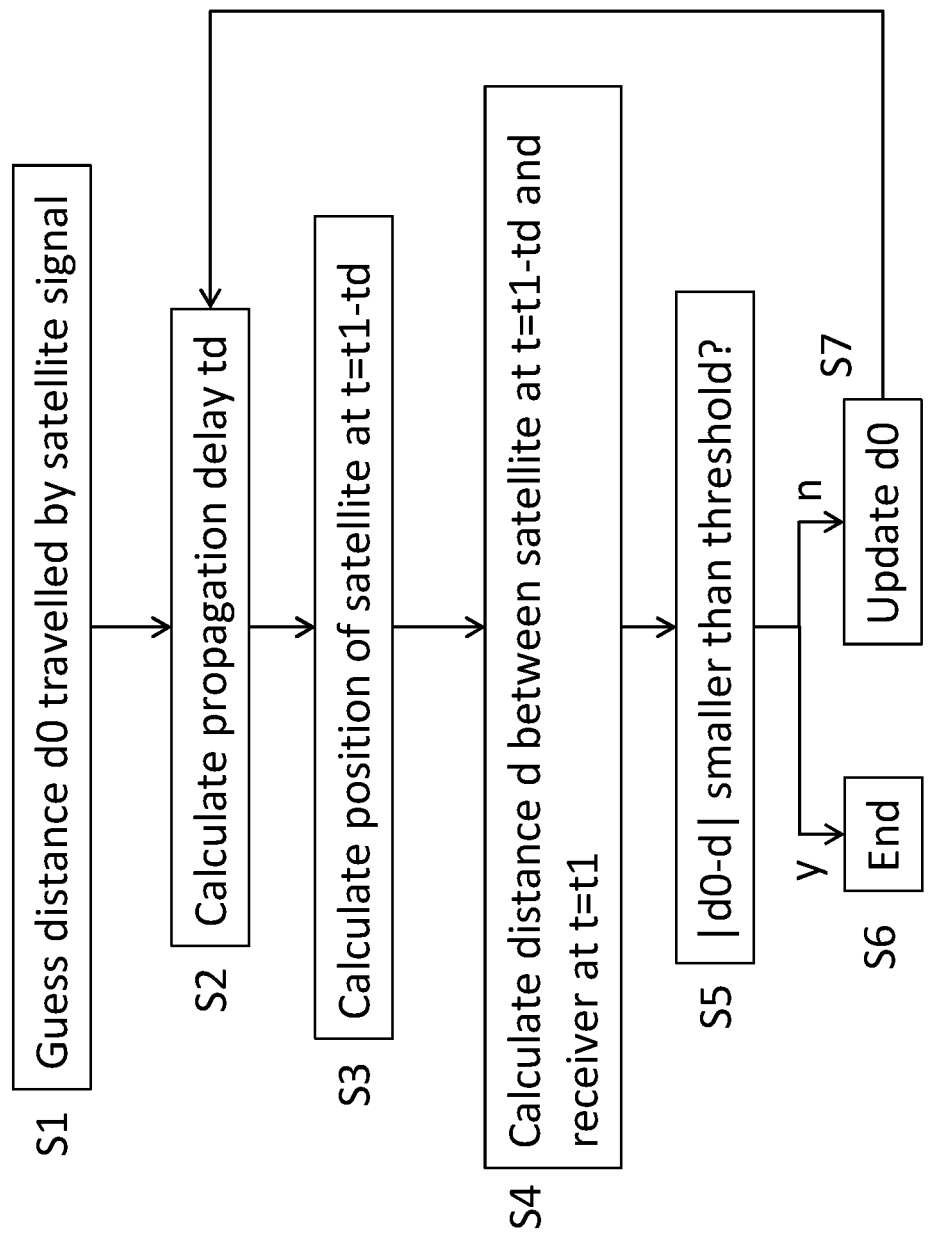
FIG. 2 illustrates a method for iteratively determining a distance between the satellite and receiver in accordance with the present invention.

Next, the validation process for the satellite signal received at t=t1 is illustrated in FIG. 2. As a first step S1, a distance d0 travelled by a (hypothetical) satellite signal 4, that could have been sent at an unknown time-instant but which would have been received at t=t1, is guessed. This guess can be based on previous estimations. The propagation delay, corresponding to the time required by signal 4 to propagate from the satellite to the receiver can be computed in step S2 using td=d0/c, with c being the effective velocity of light. This velocity may deviate from the velocity of light in vacuum and may account for differences between the speed of light in vacuum and the average speed of light in the Earth's atmosphere.

Next, the time-instant t=tt at which the satellite transmitted signal 4 can be found using t=tt=t1−td. Because the GNSS receiver is time-synchronized with the GNSS system time, the position of the satellite at the time of sending the signal, i.e. SE, can be computed in step S3 using time-instant t=tt and using orbital data corresponding to the satellite. The data required for this computation may be provided to the mobile device or may already be known by the mobile device. However, the data required for this calculation, the so called ephemeris data, is usually comprised in the satellite signal itself. This data need not be continuously received as the orbital behavior of a satellite can be considered fixed and/or predictable to a very high degree. Therefore, it may be sufficient if this data is only supplied once.

Having calculated the position of the satellite at the time of sending the satellite signal, a distance d between the satellite at t=tt and the mobile device at t=t1 can be computed in step S4. If the difference between this distance and guessed distance d0 is smaller than a given threshold, as determined in step S5, the method may end in step S6. If not, guess d0 is updated in step S7 and the method returns to step S2.

In this manner, a position SE of a satellite along a known trajectory can be calculated, such that when this satellite would have transmitted a signal when being at this position, this signal would have been received by the mobile device at position PE and at time t=t1. In addition, a distance can be computed between the satellite at this position and the receiver at position PE.

The abovementioned position SE was calculated based on a discrete position PE. In practice, the position estimation is associated with a given position accuracy measure as indicated by circle 2. This position accuracy measure may be translated into an expected range for the distance d between the satellite at t=tt and the mobile device at t=t1.

The abovementioned range can be used to determine whether the truly received satellite signal at t=t1 can be considered to be a valid signal. The received satellite signal includes information concerning the time at which the signal was sent. As the mobile device is time-synchronized, the mobile receiver is able to determine the propagation delay of the signal. By multiplying this delay with a known effective speed of light, an observed distance between satellite and receiver can be determined. If the observed distance falls within the abovementioned range, the satellite signal can be considered to be a valid signal and could be used for computing the position of the mobile receiver at t=t1. If the observed distance does not fall within the abovementioned range, the satellite signal is considered to be an invalid signal and should not be considered when computing the position of the mobile receiver at t=t1.

Figure 3:
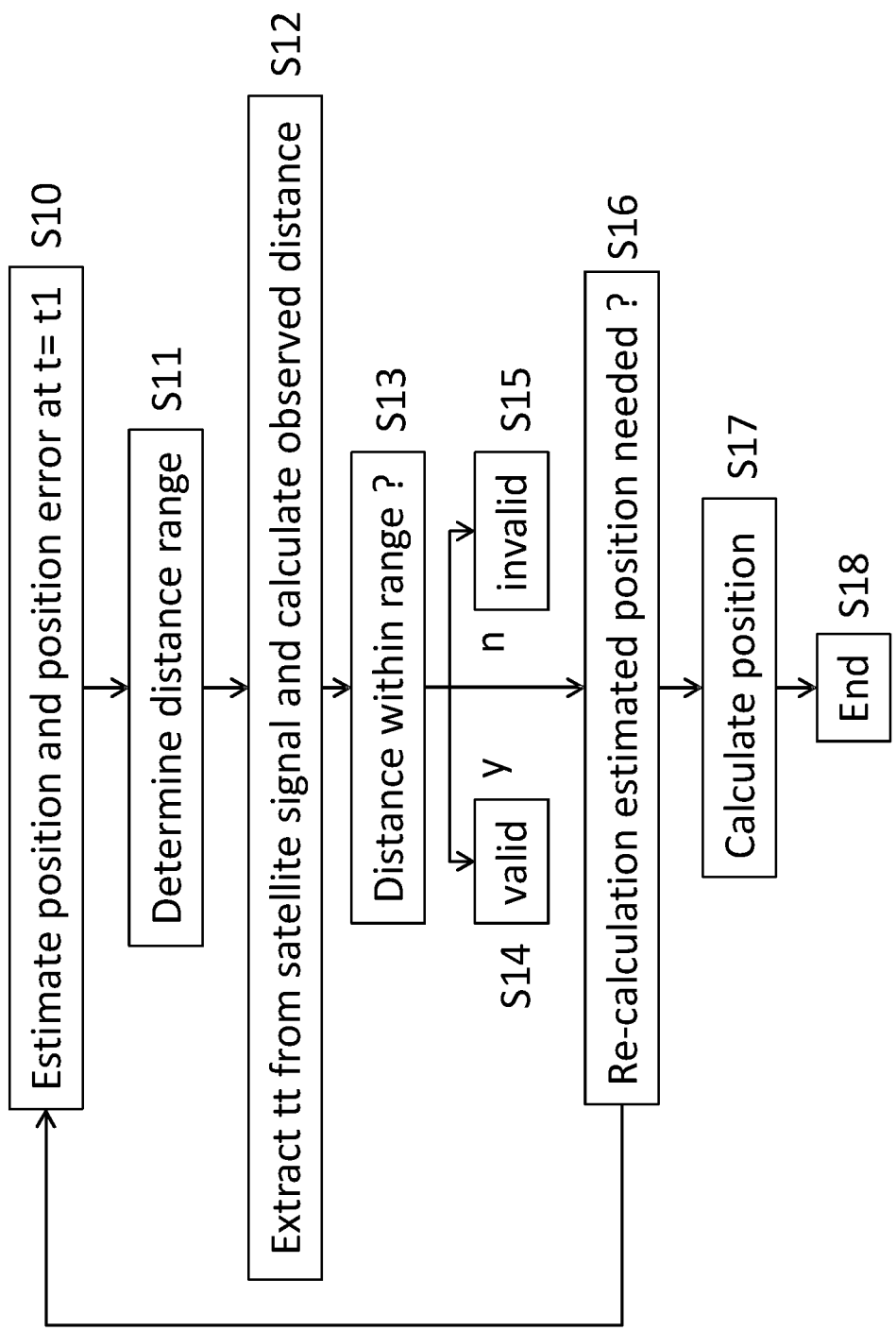
FIG. 3 illustrates a method for determining the position of the mobile device in accordance with the present invention.

FIG. 3 illustrates a method for determining the position of the mobile device at t=t1 using a plurality of received satellite signals. As a first step S10, the position and associated error are estimated. This estimation is based on the position data and motion data for the mobile device at t=t0, and the movement data describing the movement of the mobile device between t=t0 and t=t1. The movement data can be obtained using an inertial measurement unit. Additional data may be used. For example, the satellite signals received at t=t1, for which it has not yet been established whether these signals can be considered valid or invalid, can be used. Either none, one or a few, or all satellite signals may be used, as will be elucidated later.

Once the position and position accuracy measure are estimated, a distance range is determined in step S11 for at least one of the received satellite signals. This step can be performed in the manner illustrated in FIG. 2. As a next step S12, the time(s) at which the satellite(s) sent the satellite signal(s), i.e. t=tt, is extracted from the satellite signal(s). This also allows the distance travelled by the satellite signal(s) to be determined. In step S13, it is determined whether the distance(s) determined in step S13 falls within the respective range determined in step S11. If the distance corresponding to a satellite signal falls in the corresponding range, then this satellite signal is determined to be valid in step S14. Conversely, if the distance corresponding to a satellite signal falls outside of the corresponding range, then this satellite signal is determined to be invalid in step S15.

When a qualification is made, it is determined, in step S16, whether the estimated position and position accuracy measure need to be re-calculated. This may for instance apply if a validated signal has not been taken into account when estimating the position or if an invalidated signal was taken into account. If it is determined that a re-calculation should be performed, the method returns to step S10. If not, the method continues in step S17 with calculating the position and position accuracy measure of the mobile device using the validated satellite signals and the method ends in step S18. The invention does not exclude that the position estimated in the final execution of step S10 is taken as the position that is determined in step S17. Alternatively, the position estimated in S10 and the position calculated in step S17 may rely on different data sources. It is for example possible that the position calculated in step S17 is determined solely based on validated satellite signals, provided sufficient signals have been received, whereas the position estimated in step S10 may also rely on IMU data.

In steps 13-16 described above, it is determined whether a received satellite signal can be determined to be valid or invalid and whether re-calculation of the estimated position is needed. Here, several scenarios are possible depending on how the position and position accuracy measures were initially estimated in step S10:

1. Initial Estimation Based on All the Satellite Signals

In this case, if a given satellite signal is determined invalid, the process may return to provide new a position estimate, however no longer taking into account the invalidated signal. As a result of no longer using this signal, the position estimate changes. As a result, the new position estimate will be closer to the true but unknown position. Alternatively, a new position estimate is only provided after all the signals have been qualified. Hence, after each position estimation, all the signals are qualified instead of only one. The process may end when the qualification status of each of the satellite signals, i.e. not yet qualified, valid, or invalid, no longer changes.

2. Initial Estimation is Based on None of the Satellite Signals

In this case, if a given satellite signal is determined valid, the process may return to provide a new position estimate now taking into account the validated signal. As a result of using this signal, the position estimate changes. Alternatively, a new position estimate is only provided after all the signals have been qualified. Hence, after each position estimation, all the signals are qualified instead of only one. The process may end when the qualification status of each of the satellite signals. i.e. not yet qualified, valid, or invalid, no longer changes.

3. Initial Position Estimation is Based on All but One of the Satellite Signals

In this case, if the satellite signal not used for determining the estimated position is determined to be valid, the process returns to provide a new position estimate now taking into account the validated signal but excluding a different, not yet qualified, satellite signal. As a result of using this signal and excluding another signal, the position estimate changes. If the satellite signal was determined to be invalid, it will no longer be considered.

After providing a new position estimate, the process repeats itself until each of the satellite signals has been qualified. The process may end when the qualification status of each of the satellite signals, i.e. not yet qualified, valid, or invalid, no longer changes.

In the abovementioned examples, the satellite signals are qualified directly after being received. This method can therefore be applied in real-time, where updated position information is required as soon as possible, for example in navigational systems. However, in some circumstances, it only needs to be determined where the mobile device has been. For example, the mobile device may be a vehicle-mounted camera used for recording images of the surroundings of that vehicle. These images can be used to construct a database of for example a city. In these applications, it is only required to determine the position of the camera when it took the respective images. This position need not be known at the actual moment of taking the images.

For these applications, the measurements of the received satellite signals may be stored at various time-instants. In a post-processing approach, the method described above can be used to determine the positions. However, having all the measurements available for all time-instants it now becomes possible to work in a forward and backward direction. For example, the position at a time-instant t=t1 can be determined using data corresponding to a time-instant t=t2, where t2>t1. This latter case corresponds to backward estimation, whereas the method described in conjunction with FIG. 3 corresponds to forward estimation.

Figure 4:
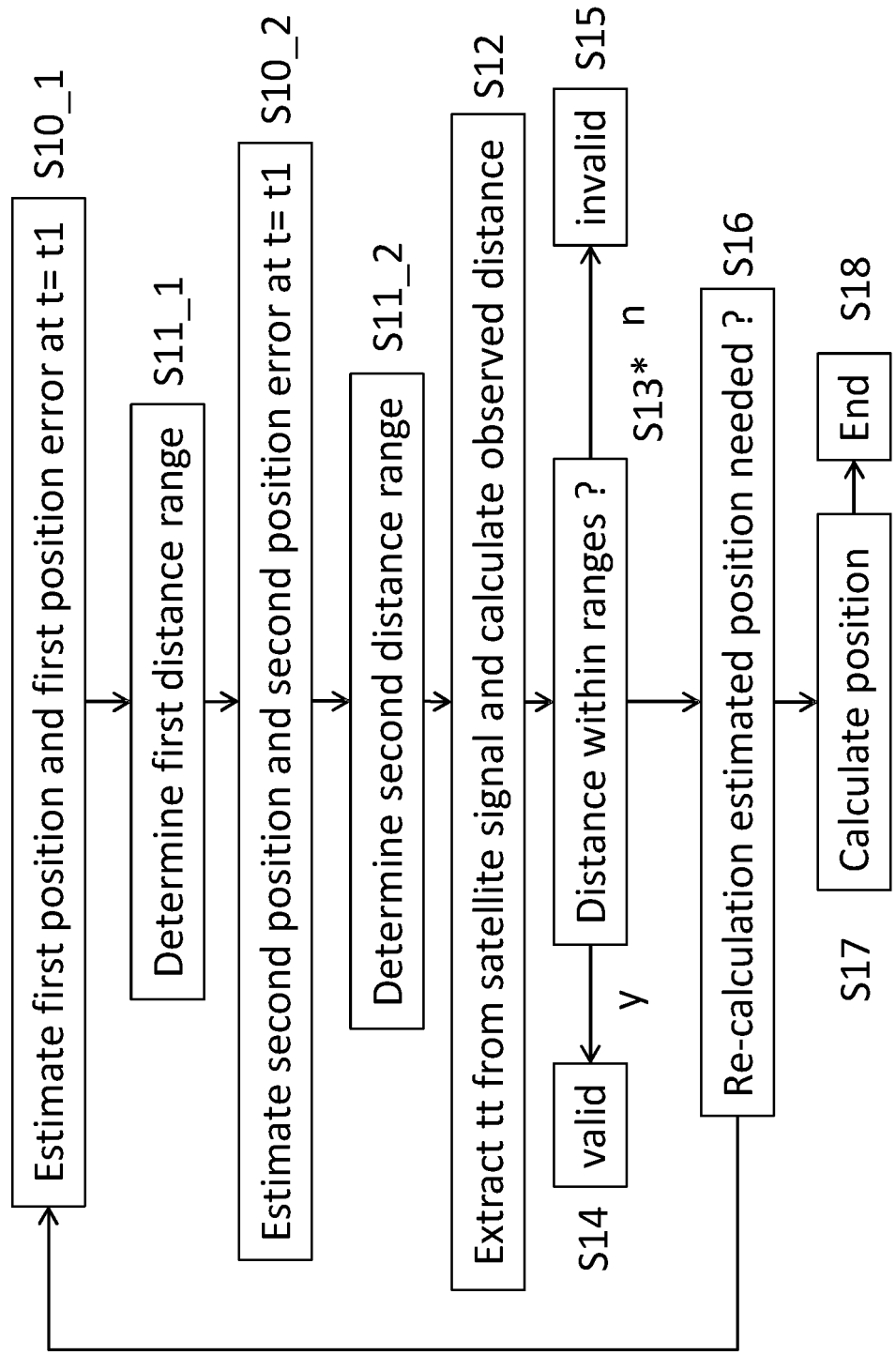
FIG. 4 illustrates another method for determining the position of the mobile device in accordance with the present invention.

The backward and forward prediction methods may be combined. This is illustrated in FIG. 4. Here, for determining the position at position t=t1, data from t=t0 and data from t=t2 may be used. Compared to the method illustrated in FIG. 3, two ranges are determined in steps S11_1 and S11_2. The first range, determined in step S11_1, is based on a forward analysis, wherein data from a previous time-instant is used, in step S10_1, to estimate a first position and position accuracy measures at a current time-instant. The second range, determined in step S11_2, is based on a backward analysis, wherein data from a future time-instant is used, in step S10_2, to estimate a second position and position accuracy measure at the current time-instant.

Step S13* differs from step S13 in that it is now determined whether the observed distance of the satellite signal falls in both the first and second ranges. Only if it does, the satellite signal is considered valid.

Similar to FIG. 13, several satellite signals can be processed simultaneously and different methods exist for estimating the position and position accuracy measure as was explained in connection with FIG. 3.

Figure 5:
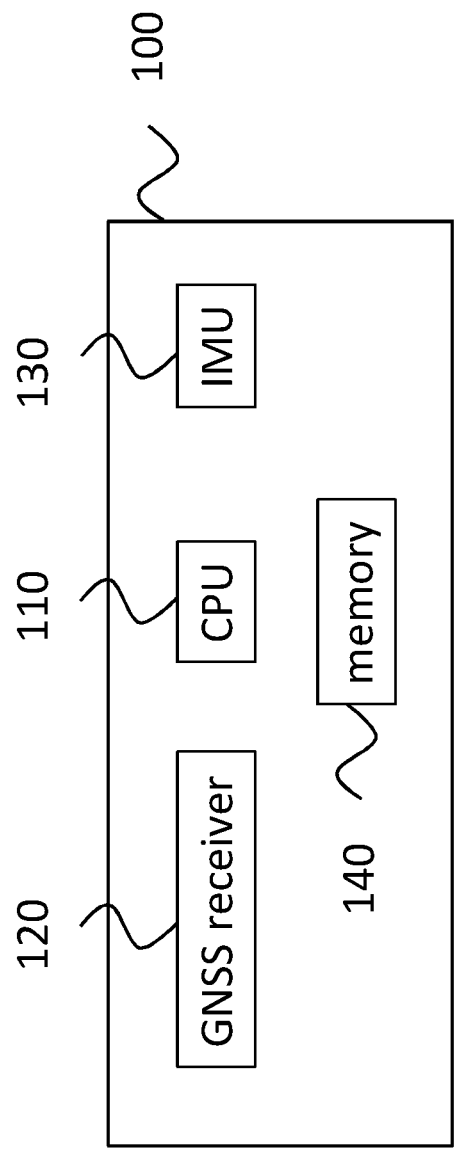
FIG. 5 illustrates an embodiment of a mobile device in accordance with the present invention.

FIG. 5 illustrates an embodiment of a mobile device 100 in accordance with the present invention. It comprises a processing unit 110 that is coupled to a GNSS receiver 120, an inertial measurement unit 130, and a memory 140. Here, memory 140 is configured for holding one or more measurements of satellite signals that have been received using the GNSS receiver and for holding one or more measurements of the inertial measurement unit. Processing unit 110 is configured to implement the method as defined above for determining a position of the mobile device.

The invention does not exclude systems wherein the functionality is distributed. For example, the mobile device may only include the IMU unit, and the GNSS receiver, and a memory for storing the various measurements. The actual processing of the results may be carried out at a location remote from the mobile device.

In a typical application, the mobile device or the above-mentioned system is mounted or mountable in or on a vehicle, such as a car.

Although the present invention has been described using embodiments thereof, the skilled person will understand that the present invention is not limited to these examples but that various modifications are possible without deviating from the scope of the invention which is defined by the appended claims.

The invention claimed is:

1. A method for estimating a position of a mobile device, said device being equipped with a GNSS receiver that is time-synchronized with a GNSS system time, the method comprising:
   a) providing a measurement of one or more GNSS satellite signals from respective GNSS satellites that were received, at a first time-instant, by the GNSS receiver;
   b) estimating a position and corresponding position accuracy measure of the mobile device for the first time-instant using: 1) obtained position and motion data for a second time-instant different from the first time-instant, 2) movement data concerning movement of the mobile device between the first and second time-instants and, optionally, 3) measurements of one or more of the received satellite signals which have not been determined to be invalid;
c) for at least one of the received satellite signals:
   c1) determining a signal propagation characteristic pertaining to said at least one satellite signal using information contained in that satellite signal;
   c2) determining an expected range for said signal propagation characteristic based on orbital behavior of the GNSS satellite that transmitted said at least one satellite signal and the estimated position and position accuracy measure;
   c3) determining that said at least one satellite signal is a valid signal upon the corresponding signal propagation characteristic falling in the determined expected range, and determining that said at least one satellite signal is an invalid signal upon the corresponding signal propagation characteristic falling outside the determined expected range; and
d) calculating the position, and the position accuracy measure, of the mobile device at the first time-instant using the valid satellite signal(s).

2. The method according to claim 1, wherein the signal propagation characteristic pertaining to said at least one satellite signal comprises a distance travelled by the respective satellite signal or a time required by said at least one satellite signal to travel said distance.

3. The method according to claim 2, wherein said at least one satellite signal comprises information concerning the time-instant at which that signal was sent, and wherein step c1) comprises:
   extracting the sent time-instant at which said at least one satellite signal was sent from said at least one satellite signal;
   determining the receive time-instant at which said at least one satellite signal was received by the GNSS receiver;
   determining the distance travelled or the time required to travel said distance based on the sent and receive time-instants.

4. The method according to claim 1, wherein step c2) comprises:
   iteratively determining a position at which a GNSS satellite would have been if this satellite had sent a satellite signal from that position that would have been received by the mobile device at the estimated position and at the first time-instant;
   determining the expected range for the signal propagation characteristic based on the iteratively determined position and the estimated position accuracy measure.

5. The method according to claim 1, wherein one or more of the received satellite signals comprises ephemeris data that allows the positions of the one or more GNSS satellites to be computed as a function of time.

6. The method according to claim 1, further comprising:
   c4) upon determining in step c3) that said at least one satellite signal is valid whereas this signal was not used for estimating the position in step b), returning to step b) at least once to estimate the position and corresponding position accuracy measure taking into account said validated at least one satellite signal; or
   c4) upon determining in step c3) that said at least one satellite signal is invalid whereas this signal was used for estimating the position in step b), returning to step b) at least once to estimate the position and corresponding position accuracy measure no longer taking into account said invalidated at least one satellite signal.

7. The method according to claim 6, wherein said returning to step b) is performed until each received satellite signal has been determined either valid or invalid and if no changes in this determination have occurred in the latest iteration of step c3).

8. The method according to claim 6, wherein, in step b), none of the received satellite signals is used to provide a first estimation of the position and corresponding position accuracy measure.

9. The method according to claim 8, wherein steps c1)-c4) are consecutively performed, each time for a different subset of the received satellite signals, the subset comprising a single satellite signal.

10. The method according to claim 6, wherein, in step b) each of the received satellite signals is used to provide a first estimation of the position and corresponding position error.

11. The method according to claim 10, wherein steps c1)-c4) are consecutively performed, each time for each of the received satellite signals.

12. The method according to claim 6, wherein in step b) all but one or more of the received satellite signals is used to provide a first estimation of the position and corresponding position accuracy measure.

13. The method according to claim 12, wherein steps c1)-c4) are consecutively performed, each time for said all but one or more of the received satellite signals.

14. The method according to claim 1, wherein a position and corresponding position accuracy measure is determined for a plurality of time-instants, said plurality of time-instants comprising said first time-instant and said second time-instant.

15. The method according to claim 14, wherein the first time-instant and the second time-instant are temporally adjacent time-instants.

16. The method according to claim 1, further comprising:
   a) determining a movement of the mobile device between the second time-instant and the first time-instant;
   b) determining the movement data from the determined movement.

17. The method according to claim 16, further comprising using an inertial measurement unit to determine the movement data, wherein the movement data comprises a determined rotation and acceleration relative to three different axes, and a respective error for these rotations and accelerations.

18. The method according to claim 16, wherein the movement of the mobile device is restricted by one or more restrictions and/or wherein the movement of the mobile device is predefined to a particular trajectory and/or speed, and wherein the movement data is derived from at least one of the one or more restrictions and said particular trajectory and/or speed.

19. A mobile device, comprising:
   a GNSS receiver that is time-synchronized with a GNSS system time;
   a memory for holding one or more measurements of satellite signals that have been received using the GNSS receiver and for holding one or more measurements of the inertial measurement unit;
   a processing unit, coupled to the memory, and configured to:
   a) provide a measurement of one or more GNSS satellite signals from respective GNSS satellites that were received, at a first time-instant, by the GNSS receiver;
   b) estimate a position and corresponding position accuracy measure of the mobile device for the first time-instant using: 1) obtained position and motion data for a second time-instant different from the first time-instant, 2) movement data concerning movement of the mobile device between the first and second time-instants and, optionally, 3) measurements of one or more of the received satellite signals which have not been determined to be invalid;

c) for at least one of the received satellite signals:
- c1) determine a signal propagation characteristic pertaining to said at least one satellite signal using information contained in that satellite signal;
- c2) determine an expected range for said signal propagation characteristic based on orbital behavior of the GNSS satellite that transmitted said at least one satellite signal and the estimated position and position accuracy measure;
- c3) determine that said at least one satellite signal is a valid signal upon the corresponding signal propagation characteristic falling in the determined expected range, and determining that said at least one satellite signal is an invalid signal upon the corresponding signal propagation characteristic falling outside the determined expected range; and d) calculate the position, and the position accuracy measure, of the mobile device at the first time-instant using the valid satellite signal(s).

20. A data carrier comprising instructions, which, when executed by a processing unit, cause the implementation of the method as defined in claim 1.

\* \* \* \* \*